2,973,363

1-(2-THENOYL)ALKYL-4-ARYLPIPERIDIN-4-OLS

Paul Adriaan J. Janssen, Antwerpse Steenweg 16′, Vosselaar, near Turnhout, Belgium No Drawing. Filed Mar. 26, 1959, Ser. No. 801,991

6 Claims. (Cl. 260—293.4)

The present invention relates to a new group of arylpiperidine derivatives and more particularly to 1-(2-thenoyl)alkyl-4-arylpiperidin-4-ols of the general structural formula

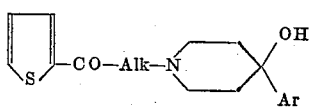

and the pharmaceutically useful salts thereof, wherein Ar is a monocyclic aryl radical, preferably of less than nine carbon atoms, and Alk is a lower alkylene radical.

The radical Ar can represent halophenyl radicals such as fluorophenyl, chlorophenyl, bromophenyl, and iodophenyl, and monocyclic aromatic hydrocarbon radicals such as phenyl, tolyl, and xylyl.

The radical Alk represents a lower alkylene radical such as methylene, ethylene, propylene, methylpropylene, butylene, pentamethylene, and hexamethylene but is preferably trimethylene.

The organic bases of the foregoing type form pharmaceutically useful non-toxic salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, penethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The compounds of this invention can be prepared by the condensation of a thenoylalkyl halide of the formula

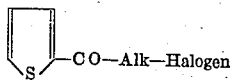

with an appropriately selected 4-arylpiperidin-4-ol. The reaction can be carried out in an inert solvent such as an aromatic hydrocarbon, e.g. benzene, toluene, xylene; a lower alkanol, e.g. ethanol, propanol, butanol; and a lower alkanone, e.g. acetone, butanone, pentanone. The reaction rate can be accelerated by the use of elevated temperatures.

Another method uses the following reaction sequence. A thenoyl halide of the formula

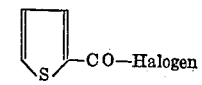

is condensed with the sodio derivative of an alkyl acetoacetate to yield the α-thenoyl derivative of the formula

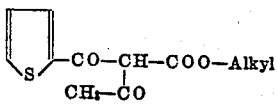

which on further treatment with sodium alkoxide yields the sodio derivative

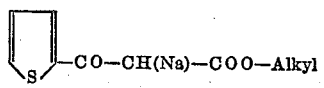

The latter is then condensed with a 4-aryl-1-(ω-haloalkyl)-piperidin-4-ol

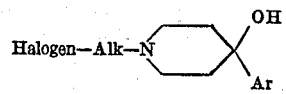

and the product is saponified and decarboxylated.

The (2-thenoyl)alkyl halides used as intermediates can be prepared by the Friedel-Crafts reaction employing, for example, 2-chlorobutyryl chloride and thiophene. The reaction can be carried out in petroleum ether solution. A milder catalyst such as stannic chloride is used rather than aluminum chloride.

The 4-arylpiperidin-4-ol intermediates can be prepared by treating the appropriate 4-aryl-1,2,3,6-tetrahydropyridine with hydrogen bromide and then by hydrolyzing the resulting 4-aryl-4-bromopiperidine to form the corresponding 4-arylpiperidin-4-ol.

The compounds of this invention have useful pharmacological properties. They are depressants of the central nervous system. In small doses they exhibit tranquilizing and hypnotic effects. They are also analgesic, antipyretic, and spasmolytic agents.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight. Temperatures are expressed in degrees centigrade (° C.), pressures are expressed in millimeters of mercury (mm.).

Example 1

A mixture of 84 parts of thiophene, 141 parts of γ-chlorobutyryl chloride, and 870 parts of benzene is cooled to about 0° C. While this temperature is maintained, 260 parts of stannic chloride are added over a 2 hour period. After the addition is completed, the cooling bath is removed and the stirring is continued for about an hour. The reaction mixture is then poured into a mixture of 60 parts of concentrated hydrochloric acid and 450 parts of ice water. The organic layer is separated, washed with water, dried over anhydrous calcium chloride, and filtered. The filtrate is concentrated under reduced pressure. The residue is distilled to yield 2-(γ-chlorobutyryl)thiophene which boils at 144–146° C. at 11 mm. of pressure.

Example 2

A solution of 95 parts of methyl bromide in 356 parts of ether is added dropwise to a refluxing suspension of 24 parts of magnesium in 214 parts of ether. The mixture is refluxed for 2 hours, and 92 parts of p-fluoroacetophenone are added in the course of 90 minutes. The refluxing is continued for 3 hours, and the mixture is stirred for 24 hours at room temperature. The Grignard complex is destroyed by the addition of ammonium chloride and 10% hydrochloric acid. The mixture is extracted with ether, and ether extracts are washed with 10% sulfuric acid and then with water. The extracts are dried over anhydrous calcium chloride, filtered, and concentrated in vacuo to remove the solvent. About 0.5 part of hydroquinone is added to the residue which is then heated to a temperature of 100–110° C. under a pressure of 50 mm. The distillate is extracted with ether and the ether extracts are dried over anhydrous calcium chloride and filtered. A small quantity of hydroquinone is added to the ether solution. The solution is fractionated by distillation to yield p-fluoro-α-methylstyrene boiling at about 93–94° C. at 80 mm. pressure.

*Example 3*

A mixture of 856 parts of ammonium chloride and 3000 parts of 36% formaldehyde is stirred and heated to about 60° C. With cooling to maintain this temperature, 944 parts of α-methylstyrene are added slowly. After the addition is completed, the mixture is stirred at room temperature until the temperature of the reaction mixture drops to about 40° C. After 2000 parts of methanol are added, the stirring is continued for 20 hours. The methanol is removed in vacuo and the residue is diluted with 3000 parts of concentrated hydrochloric acid. For 4 hours the mixture is heated with stirring at a temperature of 100° C. The mixture is cooled, diluted with 2000 parts of water, and made alkaline with 15 normal sodium hydroxide solution. The reaction mixture is extracted with benzene, and the benzene extracts are dried over anhydrous potassium carbonate and filtered. The benzene is removed from the filtrate. The remaining residue is distilled in vacuo to yield 4-phenyl-1,2,3,6-tetrahydropyridine which boils at 97–112° C. at 1 mm. pressure.

This base is dissolved in benzene. Dry, gaseous hydrogen chloride is passed through the solution, whereupon there precipitates the hydrochloride which is collected on a filter. The 4-phenyl-1,2,3,6-tetrahydropyridine hydrochloride melts at about 199–202° C.

*Example 4*

While the temperature is being maintained at about 10–20° C., anhydrous hydrogen bromide gas is passed for 7 hours through a solution of 160 parts of 4-phenyl-1,2,3,6-tetrahydropyridine in 500 parts of acetic acid. The mixture is stirred during the addition of the hydrogen bromide gas. The mixture is then allowed to stand at room temperature for 16 hours. The acetic acid and excess hydrogen bromide is removed in vacuo at a bath temperature of less than 40° C. The residue is treated with ether. This solution is cooled, and the product is collected on a filter. The 4-phenyl-4-bromopiperidene hydrobromine is recrystallized from a mixture of acetone and 2-propanol. The compound melts at about 209.5–210.5° C.

*Example 5*

A solution of 160 parts of 4-phenyl-4-bromopiperidine hydrobromide in 3000 parts of water is treated with 100 parts of 20% sodium hydroxide solution. The resulting precipitate is recovered by filtration and washed with water. The precipitate is then dissolved in toluene, and the solution is dried over anhydrous potassium carbonate and filtered. The filtrate is cooled to 0° C. The crystalline product thus obtained is collected on a filter to yield 4-phenylpiperidin-4-ol melting at 159–160° C.

*Example 6*

A mixture of 9 parts of 2-(γ-chlorobutyryl)-thiophene, 14.2 parts of 4-phenylpiperidin-4-ol, and 0.1 part of potassium iodide in 150 parts of toluene is heated at a temperature of 140–150° C. for 72 hours in a closed vessel. The mixture is cooled to room temperature and then filtered. The solid residue is triturated with a mixture of water and ether. The ether layer is separated and added to the filtrate from the original reaction mixture. The combined toluene and ether solution is dried over anhydrous potassium carbonate, filtered, and concentrated to about one-fourth of its volume. The solution is cooled, and the resulting product is collected on a filter and recrystallized from diisopropyl ether to yield 1-[γ-(2-thenoyl)-propyl]-4-phenylpiperidin-4-ol melting at about 112.4–114.2° C.

The hydrochloride can be prepared by passing dry hydrogen chloride gas through the above described toluene-ether solution. The precipitated, hydrochloride salt is collected on a filter and recrystallized from 2-propanol. In this manner there is obtained the white, crystalline 1-[γ-(2-thenoyl)propyl]-4-phenylpiperidin-4-ol hydrochloride.

The structural formula is

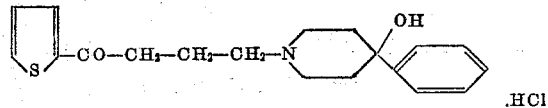

*Example 7*

Substitution of β-methyl-γ-chlorobutyryl chloride for the γ-chlorobutyryl chloride in Example 1 yields the colorless needles of 2-(β-methyl-γ-chlorobutyryl)thiophene.

Substitution of 9.7 parts of 2-(β-methyl-γ-chlorobutyryl)thiophene for the 2-(γ-chlorobutyryl)thiophene in Example 6 yields 1-[β-methyl-γ-(2-thenoyl)-propyl]-4-phenylpiperidin-4-ol in white, crystalline prisms.

*Example 8*

Substitution of an equimolar amount of p-fluoro-α-methylstyrene for the α-methylstyrene in Example 3 yields 4-(p-fluorophenyl)-1,2,3,6-tetrahydropyridine boiling at about 139–141° C. at 4 mm. pressure.

Substitution of an equimolar amount of 4-(p-fluorophenyl)-1,2,3,6-tetrahydropyridine for the 4-phenyl-1,2,3,6-tetrahydropyridine in Example 4 yields 4-(p-fluorophenyl)-4-bromopiperidine hydrobromide melting at about 143–144° C.

Substitution of an equimolar amount of 4-(p-fluorophenyl)-4-bromopiperidine hydrobromide for the 4-phenyl-4-bromopiperidine hydrobromide in Example 5 yields 4-(p-fluorophenyl)piperidin-4-ol melting at about 116.4–117.6° C.

Substitution of 15.6 parts of 4-(p-fluorophenyl)-piperidin-4-ol for the 4-phenylpiperidin-4-ol in Example 6 yields 1-[γ-(2-thenoyl)propyl]-4-(p-fluorophenyl)piperidin-4-ol melting at about 123.8–125.8° C.

*Example 9*

A solution of 192 parts of p-chlorobromobenzene in 124 parts of ether is added dropwise to a suspension of 24 parts of magnesium in 214 parts of ether. The mixture is refluxed for 2 hours. The mixture is cooled to about 5° C. and 39 parts of acetone are added in the course of 2 hours. The mixture is stirred for 24 hours at room temperature, and then decomposed with ammonium chloride solution and 10% hydrochloric acid. The solution is extracted with ether. The ether layer is washed with 10% sulfuric acid and then with water. This solution is dried over anhydrous calcium chloride, filtered, and concentrated in vacuo. The residual carbinol is heated under reduced pressure in the presence of 0.5 part of hydroquinone for 2 hours on an oil bath at a temperature of 100–110° C. The styrene and water are distilled off. The product is extracted with ether. The ether extract is dried over anhydrous calcium chloride, filtered, and fractionated over hydroquinone to yield p-chloro-α-methylstyrene boiling at about 83–85° C. at 15 mm. pressure.

Substitution of an equimolar amount of p-chloro-α-methylstyrene for the α-methylstyrene in Example 3 yields 4-(p-chlorophenyl)-1,2,3,6-tetrahydropyridine boiling at about 157–160° C. at 8 mm. pressure.

Substitution of an equimolar amount of 4-(p-chlorophenyl)-1,2,3,6-tetrahydropyridine for the 4-phenyl-1,2,3,6-tetrahydropyridine in Example 4 yields 4-(p-chlorophenyl)-4-bromopiperidine hydrobromide melting at about 213–215° C.

Substitution of an equimolar amount of 4-(p-chlorophenyl)-4-bromopiperidine hydrobromide for the 4- phenyl-4-bromopiperidine hyrobromide in Example 5 yields 4-(p-chlorophenyl)piperidin-4-ol melting at about 134.4–136° C.

Substitution of 17 parts of 4-(p-chlorophenyl)piperidin-4-ol for the 4-phenylpiperidin-4-ol in Example 6 yields 1-[γ-(2-thenoyl)propyl]-4-(p-chlorophenyl)piperidin-4-ol melting at 122–123° C. and 1-[γ-(2-thenoyl)-propyl]-4-(p-chlorophenyl)piperidin-4-ol hydrochloride melting at about 212.5–214° C.

*Example 10*

Substitution of an equimolar amount of α-chloroacetyl chloride for the γ-chlorobutyryl chloride in Example 1 yields the white, prismatic crystals of 2-(α-chloroacetyl)-thiophene.

Substitution of an equimolar amount of m-bromoacetophenone for the p-fluoroacetophenone in Example 2 yields m-bromo-α-methylstyrene boiling at about 99–102° C. at 11 mm. pressure.

Substitution of an equimolar amount of m-bromo-α-methylstyrene for the α-methylstyrene in Example 3 yields 4-(m-bromophenyl)-1,2,3,6-tetrahydropyridine. The hydrochloride melts at about 261–267° C.

Substitution of an equimolar amount of 4-(m-bromophenyl)-1,2,3,6-tetrahydropyridine for the 4-phenyl-1,2,3,6-tetrahydropyridine in Example 4 yields 4-(m-bromophenyl)-4-bromopiperidine hydrobromide.

Substitution of an equimolar amount of 4-(m-bromophenyl)-4-bromopiperidine hydrobromide for the 4-phenyl-4-bromopiperidine hydrobromide in Example 5 yields the pale-yellow crystals of 4-(m-bromophenyl)-piperidin-4-ol.

Substitution of 8.5 parts of 2-(α-chloroacetyl)-thiophene for the 2-(γ-chlorobutyryl)thiophene in Example 6 and substitution of 20.5 parts of 4-(m-bromophenyl)-piperidin-4-ol for the 4-phenylpiperidin-4-ol in Example 6 yields the colorless needles of 1-[α-(2-thenoyl)methyl]-4-(m-bromophenyl)piperidin-4-ol.

*Example 11*

Substitution of an equimolar amount of p-methylacetophenone for the p-fluoroacetophenone in Example 2 yields p-methyl-α-methylstyrene boiling at about 72–74° C. at 13 mm. pressure.

Substitution of an equimolar amount of p-methyl-α-methylstyrene for the α-methylstyrene in Example 3 yields 4-(p-tolyl)-1,2,3,6-tetrahydropyridine boiling at about 162–170° C. at 10 mm. pressure.

Substitution of an equimolar amount of 4-(p-tolyl)-1,2,3,6-tetrahydropyridine for the 4-phenyl-1,2,3,6-tetrahydropyridine in Example 4 yields 4-(p-tolyl)-4-bromopiperidine hydrobromide melting at about 190–192° C.

Substitution of an equimolar amount of 4-(p-tolyl)-4-bromopiperidine hydrobromide for the 4-phenyl-4-bromopiperidine hyrdobromide in Example 5 yields 4-(p-tolyl)-piperidin-4-ol melting at about 136–137° C.

Substitution of 15.3 parts of 4-(p-tolyl)-piperidin-4-ol for the 4-phenylpiperidin-4-ol in Example 6 yields 1-[γ-(2-thenoyl)propyl]-4-(p-tolyl)piperidin-4-ol hydrochloride melting at about 190–191° C.

*Example 12*

Substitution of an equimolar amount of δ-chlorovaleryl chloride for the γ-chlorobutyryl chloride in Example 1 yields 2-(δ-chlorovaleryl)thiophene.

Substitution of 9.8 parts of 2-(δ-chlorovaleryl)thiophene for the 2-(γ-chlorobutyryl)thiophene in Example 6 and substitution of 16.4 parts of 4-(o,p-xylyl)-piperidin-4-ol for the 4-phenylpiperidin-4-ol in Example 6 yields the white, flaky crystals of 1-[δ-(2-thenoyl)butyl]-4-(o,p-xylyl)piperidin-4-ol.

What is claimed is:

1. A compound of the formula

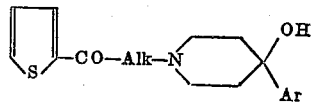

wherein Ar is a member of the class consisting of phenyl, halophenyl, tolyl and xylyl and wherein Alk is a lower alkylene radical.

2. 1-[γ-(2-thenoyl)propyl]-4-phenylpiperidin-4-ol.
3. 1-[γ-(2-thenoyl)propyl]-4-(p-tolyl)piperidin-4-ol.
4. A compound of the formula

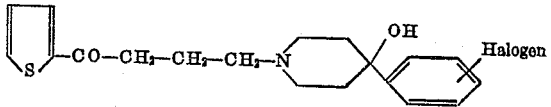

5. 1 - [γ - (2 - thenoyl)propyl] - 4 - (p-fluorophenyl) - piperidin - 4 - ol.
6. 1 - [γ - (2 - thenoyl)propyl] - 4 - (p-chlorophenyl) - piperidin - 4 - ol.

References Cited in the file of this patent

UNITED STATES PATENTS

| 2,649,444 | Barrett | Aug. 18, 1953 |
| 2,837,525 | Ruddy et al. | June 3, 1958 |